No. 643,792. Patented Feb. 20, 1900.
A. D. GATES.
DIVISIONAL OR KNOCKDOWN BOLT OR RIVET.
(Application filed Mar. 29, 1899.)
(No Model.)
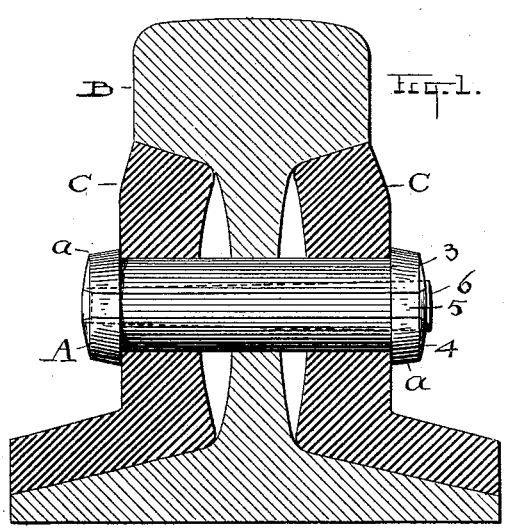
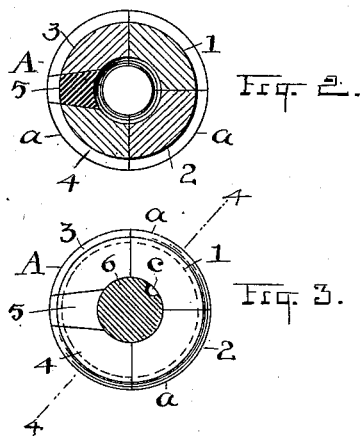
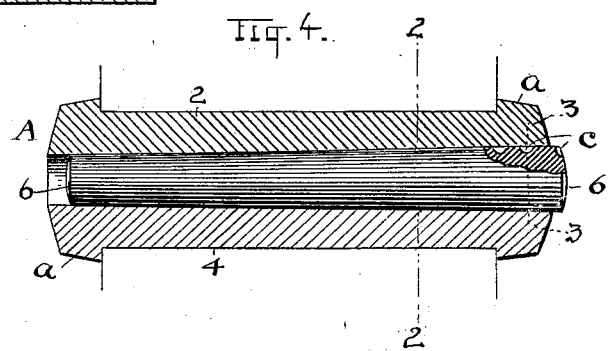
ATTEST
INVENTOR
ALFONSO DERAY GATES.
BY H. T. Fisher
ATTY

UNITED STATES PATENT OFFICE.

ALFONSO DERAY GATES, OF CLEVELAND, OHIO.

DIVISIONAL OR KNOCKDOWN BOLT OR RIVET.

SPECIFICATION forming part of Letters Patent No. 643,792, dated February 20, 1900.

Application filed March 29, 1899. Serial No. 710,933. (No model.)

*To all whom it may concern:*

Be it known that I, ALFONSO DERAY GATES, a citizen of the United States, residing at Cleveland, in the county of Cuyahoga and State of Ohio, have invented certain new and useful Improvements in Divisional or Knockdown Bolts or Rivets; and I do declare that the following is a full, clear, and exact description of the invention, which will enable others skilled in the art to which it appertains to make and use the same.

My invention relates to separable or knockdown bolts or rivets; and the invention consists in a bolt or rivet which is formed in separate and separable sections longitudinally, so that the parts can be assembled and set up for use and perform all the offices of a bolt or rivet made in a single piece and used as long as desired, and yet have the advantage of separability and removal at any time without injury to any of the parts and of being ready to set up and take down at any time and as often as may be desired. In this manner also I am enabled to employ different metals for the different parts or sections, if desired, and altogether I claim to have produced a materially stronger and better article for all purposes than is obtainable in a single piece or in bolts and rivets as they are ordinarily made.

In the accompanying drawings, Figure 1 is designed to show one of the many uses to which my improved article may be applied and represents a cross-section of a railway-rail and fish-bars, presumably, and one of my new bolts securing the parts together and shown also in Figs. 2, 3, and 4. Fig. 2 is a cross-section of the bolt on a line corresponding to 2 2, Fig. 4, but with the central or core section removed. Fig. 3 is an end elevation of the outer or body portion of the bolt and a cross-section of the core on line 3 3, Fig. 4. Fig. 4 is a longitudinal sectional elevation on line 4 4, Fig. 3.

The article as thus shown in the several views may be regarded as either a bolt or a rivet, or both; but for convenience of description and claims the word "bolt" will be used in a generic sense to cover both ideas.

The body proper of the bolt consists of five longitudinal sections 1, 2, 3, 4, and 5, two of which, 1 and 2, are alike and constitute only half of the body. The other half comprises three separate parts—the sections 3 and 4, which also are alike, and the intermediate section 5, which is the key or spreading member of the body and serves to tighten up all the others when the core 6 is driven to place. All these parts, except the core 6, have a flange or flange portion *a* at each end, so that when they are assembled and locked in position they are equal in effect to what a bolt would be which has an integral flanged head at each end, a form of bolt which of course is not practicable. However, what is impracticable in a solid bolt is made so by forming the bolt in parts, as shown.

The several parts 1, 2, 3, 4, and 5 of the body when assembled constitute a complete tube or cylinder in so far as outline between their flanges is concerned, the same as a solid round bolt of that size would be; but yet they necessarily possess the novel advantage of expansibility in order to be tightened up and firmly secured in their operating position— that is, they are constructed to be introduced into or through the bolt-hole in such a way as will enable the parts thereof to occupy an assembled and working relation and then are tightened up into such relation by the core 6, working in conjunction with wedge 5 and constituting a compound wedge that completely locks all the parts in place. When this is done, the parts remain together and make a compact embodiment, but yet are separable under certain conditions. To accomplish this result, the several parts are constructed relatively as shown, each of the parts of the body forming in cross-section a segment of a complete circle, but with the difference that in parts 1 and 2 and 3 and 4 the longer radius is outside, while in part 5 the longer radius is on the inside of the segment, thus making it in cross-section assume the form of a wedge, with a gradually-narrowing wedge-space for it to work in between sections 3 and 4 from within outward. The bore centrally of the body within the said several parts necessarily is circular in cross-section; but it is also slightly tapered between its ends, corresponding substantially to the taper of core 6, and as the key-section 5 is the accommodating member of the body as well as the wedge member of the body and is the last one to be placed in position before the core is entered it follows that as the core is driven in the expanding effect upon the entire body will follow not only from its own wedging character and effect, but from the spreading occasioned by the tightening-section 5. This brings all the parts into the relation at last substantially as shown in Figs. 1 to 4, and the bolt presumably is locked in place, with its end flanges so engaged that it is impossible for the bolt to work out or get loose.

The bolt 6 usually is of a hard metal and preferably steel and of a size to expand the body as fully as may be needed when it enters relatively as seen in Fig. 4. When so entered, it still has left a portion of the bore at the smaller end unoccupied, thus affording an opening for readily entering a drift-bolt or other instrument to drive the core forcibly out again when desired. Just below the head of the core 6 on its side are a few scattered cavities $c$, adapted to receive more or less of the metal from the body when the flange $a$ is wrought upon in some manner, as by a rivet set to drive sufficient of its metal into these cavities to lock the core against possible displacement from jarring or other action incident to use, and yet leaving it so that a drift-pin can be inserted and expel the bolt by cutting away whatever metal may have been driven into the cavities $c$.

Fig. 1 affords one example of use to which the bolt A is admirably adapted, the railway-rail B having two coupling-bars C on its sides united by my improved bolt passing through said bars and the web of the rail. However, this is only one of many uses to which this bolt is adapted, and obviously its use is not limited to any special place or association of parts.

What I claim as new, and desire to secure by Letters Patent, is—

1. A bolt formed in longitudinal sections and having a core tapered uniformly from one end to the other and located centrally with outer sections all around it, substantially as described.

2. A bolt having its body formed in a series of longitudinal sections with lateral flanges on each end to constitute heads for the bolt, and a core centrally in the bolt tapered uniformly from end to end and circular in cross-section, substantially as described.

3. The bolt having a body formed in sections and one of the said sections wedge shape transversely from end to end, and a wedging-core in contact with the inner edges of all the said sections and inclosed thereby, substantially as described.

4. The body of the bolt formed of a series of sections running from end to end and having head portions on each end and segmental in cross-section, and a uniformly-tapered core constructed cicular in cross-section at one end to be locked in said body, substantially as described.

5. A bolt having a body consisting of longitudinal parts segmental in cross-section and one member of said parts arranged with its greater width reversely to the others, thereby constituting a wedging member for tightening the bolt, and a tapered core bearing against all said parts alike practically their entire length, substantially as described.

6. The bolt consisting of a series of longitudinal parts having each a lateral portion at each end forming part of a common head and curved transversely on their inner edges, and a central tapered core bearing against all said edges and constructed at its end to effect locking engagement with the body of the bolt itself, substantially as described.

7. A bolt having a body formed in a series of transversely-segmental parts extending its entire length, one of which parts has its greater arc on the inside of the bolt, and a tapered member constructed to be driven centrally in between all said parts and to form the core of the bolt, substantially as described.

Witness my hand to the foregoing specification this 21st day of March, 1899.

ALFONSO DERAY GATES.

Witnesses:
H. T. FISHER,
R. B. MOSER.